June 17, 1969  D. R. SHOTTER  3,450,002
INDEXING HEAD FOR A MACHINE TOOL
Filed June 5, 1967  Sheet 1 of 6

INVENTOR:-
DOUGLAS RALPH SHOTTER
BY
ATTORNEYS

INVENTOR :-
DOUGLAS RALPH SHOTTER

June 17, 1969  D. R. SHOTTER  3,450,002
INDEXING HEAD FOR A MACHINE TOOL

Filed June 5, 1967

INVENTOR:-
DOUGLAS RALPH SHOTTER
BY
ATTORNEYS

United States Patent Office 3,450,002
Patented June 17, 1969

3,450,002
INDEXING HEAD FOR A MACHINE TOOL
Douglas Ralph Shotter, Foleshill, England, assignor to Alfred Herbert Limited, Foleshill, England
Filed June 5, 1967, Ser. No. 643,720
Claims priority, application Great Britain, June 4, 1966, 24,985/66
Int. Cl. B23c 1/12, 9/00
U.S. Cl. 90—16                                5 Claims

ABSTRACT OF THE DISCLOSURE

An indexing head, for a machine tool, for bringing a succession of different tools to an operating station includes at least two, oppositely-directed, tool spindles which are arranged chordwise to a tool spindle unit which can be indexed about an axis and be locked in operative position by axially-separable dog clutch elements.

---

The invention relates to an indexing head, for a machine tool, of the kind in which at least two tool-carrying spindles are supported from a tool spindle unit which is adapted to be indexed for bringing one of the said spindles to an operative position in which it is driven for the tool it carries to operate on a workpiece, and for simultaneously bringing another of the said spindles, in an undriven condition, to a tool exchange station. Hitherto, with an indexing head of this kind, it has been necessary to provide a clutch to discontinue the drive while an indexing operation is being effected; and it is the object of the invention to avoid the provision of such a clutch.

According to the invention, the tool spindle unit and a body portion of the head are respectively fast with the coacting elements of an axially disengageable toothed coupling for holding them positively in a relatively indexed position, and the tool spindle unit and body portion respectively support radially-disengageable driving, and driven toothed wheels in the drive to that spindle which is in the operative position, such that when the drive to the driving toothed wheel is disconnected the coupling elements and, with them, the tool spindle unit and body portion can be axially separated to disengage the driving and driven toothed wheels and free the tool spindle unit for an indexing movement, whereafter the coupling elements can be re-engaged in the new indexed position with a similar driven toothed wheel of that spindle which has been newly brought to the operative position engaged with the driving toothed wheel.

According to a feature of the invention the normal drive to the driving toothed wheel is from a change-speed gearing which includes a main clutch for establishing or discontinuing the main drive, and also a clutch means for selectively driving the driving toothed wheel at a very low, or "creep" ratio. Both of these drives can be arranged to provide reverse rotation of the driving toothed wheel.

According to a further feature a ratchet and pawl mechanism is provided for holding the driving toothed wheel in such a position of orientation that after disengagement from the driven toothed wheel of the spindle to be indexed from the operative position it is in a proper position of orientation to be radially engaged by the driven toothed wheel of the spindle next to be indexed to the operative position.

According to yet another feature the disengagement of the disengageable coupling causes a dog clutch in a drive for indexing the tool spindle unit to be engaged.

In such a case, and according to a still further feature the tool spindle unit is indexed by a rack and pinion arrangement of which the rack is driven by the piston of a fluid-pressure-operated piston and cylinder arrangement.

Also in such a case, and according to another feature the disengagement of the disengageable coupling causes respective detents to hold the driven toothed wheel of the spindle which is in the operative position, and the spindle which is in the tool exchange station in the appropriate position of orientation for re-engagement with the driving toothed wheel.

The invention is exemplified by the accompanying drawings, in which.

Figure 1:
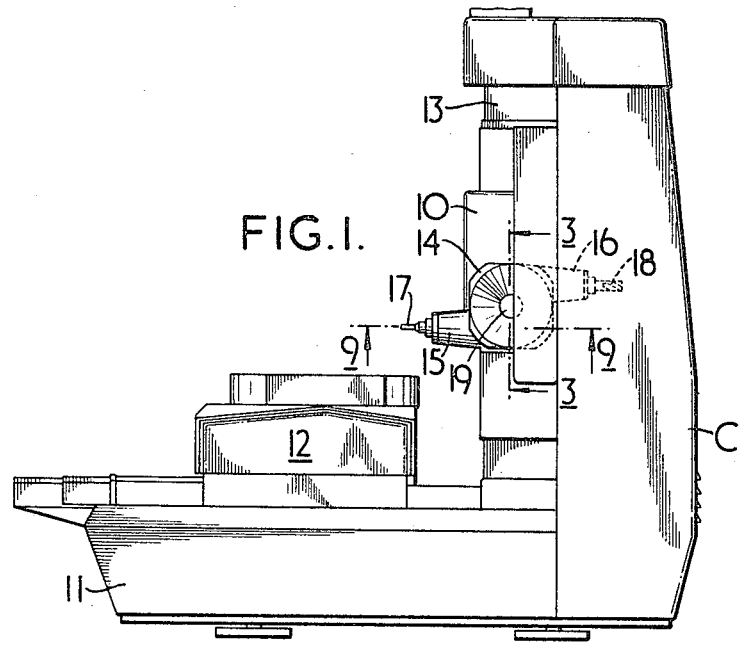
FIGURE 1 is a side elevation of one embodiment in which tool-exchanging is effected from a driven magazine which, in the example illustrated, is of the endless belt type.
Figure 2:
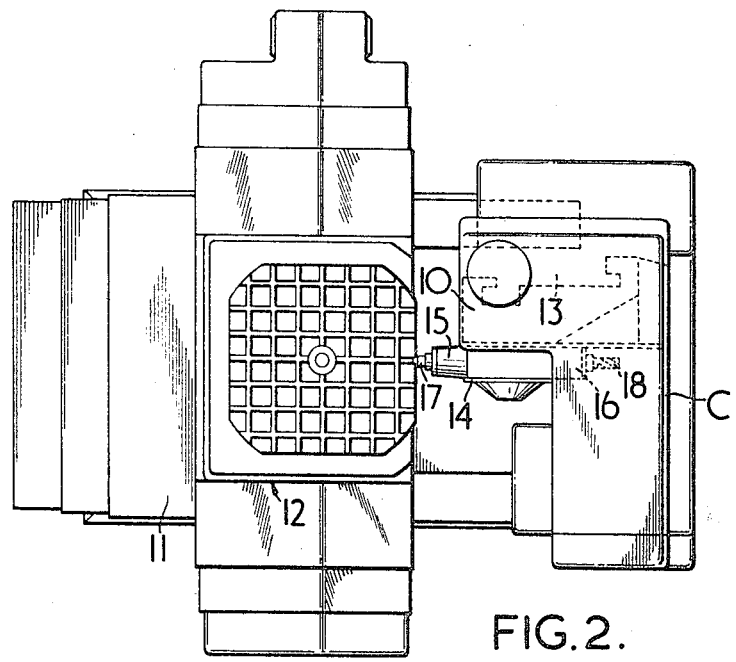
FIGURE 2 is a plan view corresponding with FIGURE 1.

Referring firstly to FIGURES 1 and 2, the indexing head 10 is shown applied to a machine tool including a bed 11 on which is a saddle and table unit 12 on which a workpiece (not shown) is to be supported. The indexing head is vertically adjustable on the machine column 13 and carries a spindle unit 14. A casing C for an endless belt-type tool magazine (not shown) is supported from the machine base, although it is now made clear that the magazine could be of a drum-type or, in the case where tool exchange is to be effected manually, be eliminated altogether.

In the example shown the spindle unit 14 is provided with bosses 15 and 16 in which are supported respective tool-carrying spindles 15a, 16a (see FIGURE 3) on which are mounted tools 17 and 18. Tool 17 is shown in the operating position (hereinafter called the front position) and tool 18 in the tool-exchange position (hereinafter called the rear position), and it will be seen that the spindles are parallel, but extend from the unit oppositely to each other. While tool 17 is operating on a workpiece, tool 18 is within casing C for the purpose of being exchanged for another tool in the belt-type magazine by means not forming part of the present invention. The arrangement shown is such that the head 10 can be raised or lowered for bringing tool 17 into proper relationship with the workpiece for an operation on the latter.

Figure 3:
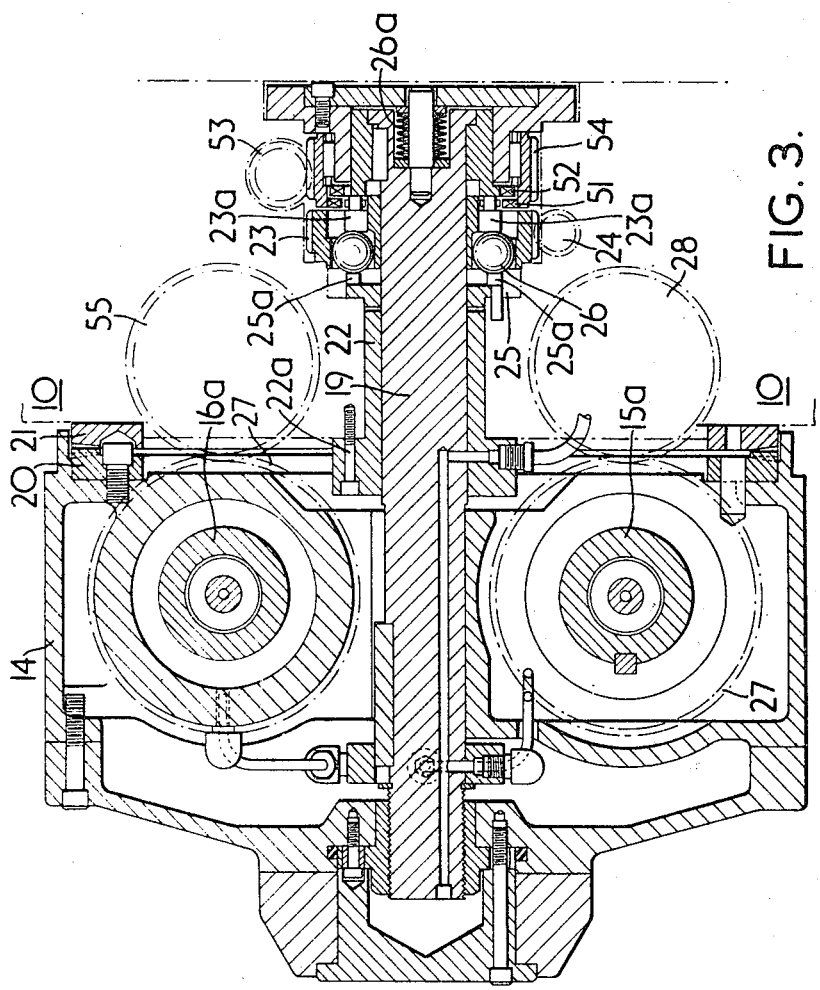
FIGURE 3 is a section on the line 3—3 of FIGURE 1, drawn to a larger scale.
Figure 7:
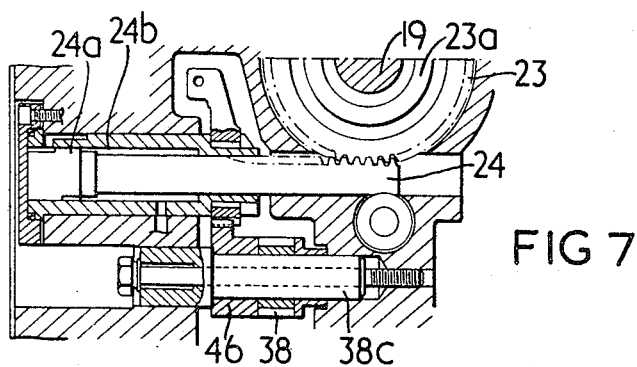
FIGURE 7 is a section on the line 7—7 of FIGURE 6.
Figure 9:
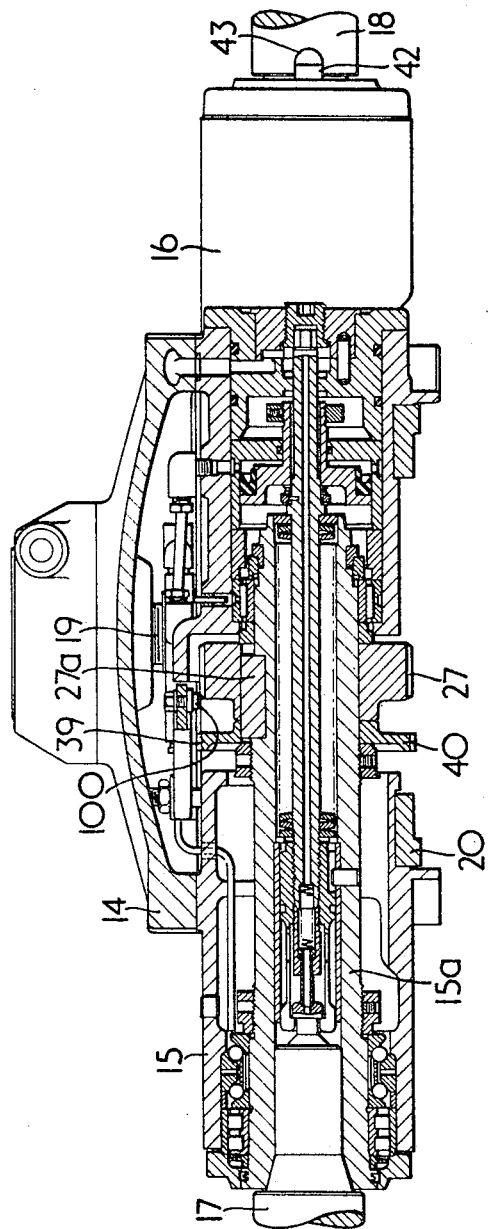
FIGURE 9 is a section on the line 9—9 of FIGURE 1.

Spindle unit 14 is rotatable about a shaft 19 supported from the head 10 for indexing purposes, and as shown in FIGURE 3 these parts are respectively provided with coaxial, taper-toothed coupling rings 20 and 21 which, when engaged with each other, hold both spindles accurately in position. FIGURE 3 also shows that shaft 19 is slidably and rotatively journalled in a flanged sleeve 22 fixed by screws 22a to the head, and has a pinion 23 journalled upon it. Pinion 23 is meshed by a rack 24, reciprocable by a fluid pressure piston and cylinder arrangement 24a, 24b, (See FIGURE 7), and the end of a ring 25 fast with sleeve 22, has six cam faces 25a (of which only two are shown) between which, and an end face of a thrust ring 23a, thrust balls 26 are engaged to hold the coupling rings engaged with each other. An appropriate rotation of pinion 23 will move balls 26 out of their locking position so that a spring 26a can move shaft 19 to the left of the figure and disengage the coupling rings to free spindle unit 14 for a rotational indexing movement. Simultaneously, detents 100 (one of which is shown in FIGURE 9) engage between two successive teeth of two gear wheels 27 respectively fast with spindles 15a and 16a to hold them in rotational positions to which they have been adjusted.

When the coupling rings 20 and 21 are in full engagement the gear wheel 27 of the spindle in the front position (i.e., 15a in FIGURES 1 to 3) meshes an idler gear wheel 28 which is supported within the head 10 and is drivable at a selected ratio from a change-speed gearing (not shown). When, however, the coupling rings are separated as above described for freeing the spindle unit 14 for rotation to the next indexed position gear wheels 27 and 28 are consequently moved radially out of mesh to permit the indexing movement to be effected as hereinafter described.

At the end of the indexing movement tool spindle 16a will bring another tool to the front position, and so that its gear wheel 27 will readily mesh gear wheel 28 for the drive to be established as both gear wheels 27 and gear wheels 28 are locked in rotative positions which will enable meshing to take place in the radial direction of the wheels as will presently be described with reference to FIGURES 4 and 6.

Figure 4:
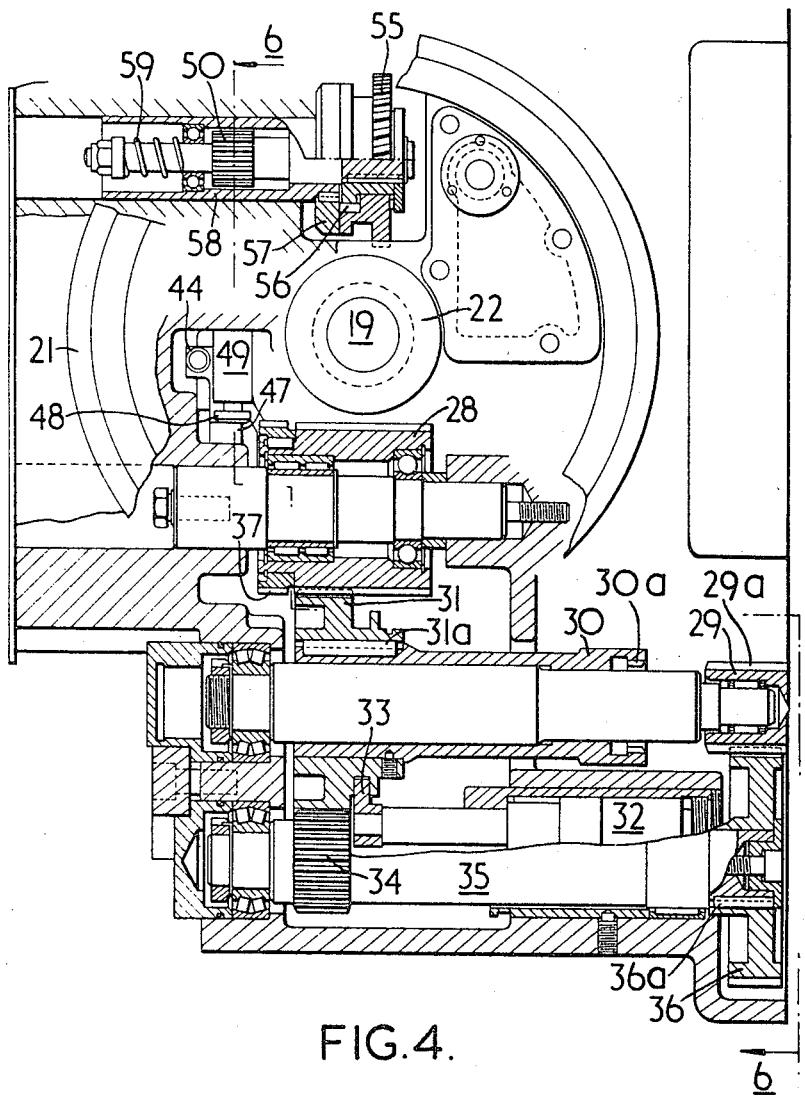
FIGURE 4 is a sectional view through a portion of the driving arrangements.

As shown by FIGURE 4 the drive for idler gear wheel 28 is through two alternative trains of gear wheels selectively driven, to provide a high speed-range or a low speed-range, from an input gear wheel 29 which is driven at a desired ratio by the change-speed gearing. For the high speed-range an internally-toothed sleeve 30 is slid into clutching engagement 30a, 29a with the input gear wheel so that a gear wheel 31 keyed to the sleeve at 31a drives the idler gear wheel, while for the low speed-range an hydraulic actuator 32 is operated to cause a fork 33 to slide gear wheel 31 into mesh with a gear wheel 34 fast on a shaft 35 which also has fast with it a gear wheel 36 permanently meshed with input gear wheel 29 keyed at 36a to shaft 35.

Associated with the change-speed gearing is a creep-speed drive (not shown) to the idler gear wheel 28, the this drive includes a slipping clutch (also not shown). Idler gear wheel 28 is fast with a ratchet wheel 37 which coacts with a pawl 38 (see FIGURE 6) to be moved into its operative position to arrest the creep of the idler gear wheel and lock it in a rotative position in which it positions the gear wheel 27 in the front position in readiness for a subsequent tool exchanging operation when moved to the rear position, and in which it is itself positioned to be easily meshed with the gear wheel 27 of the spindle next to be moved into the front position.

Figure 5:
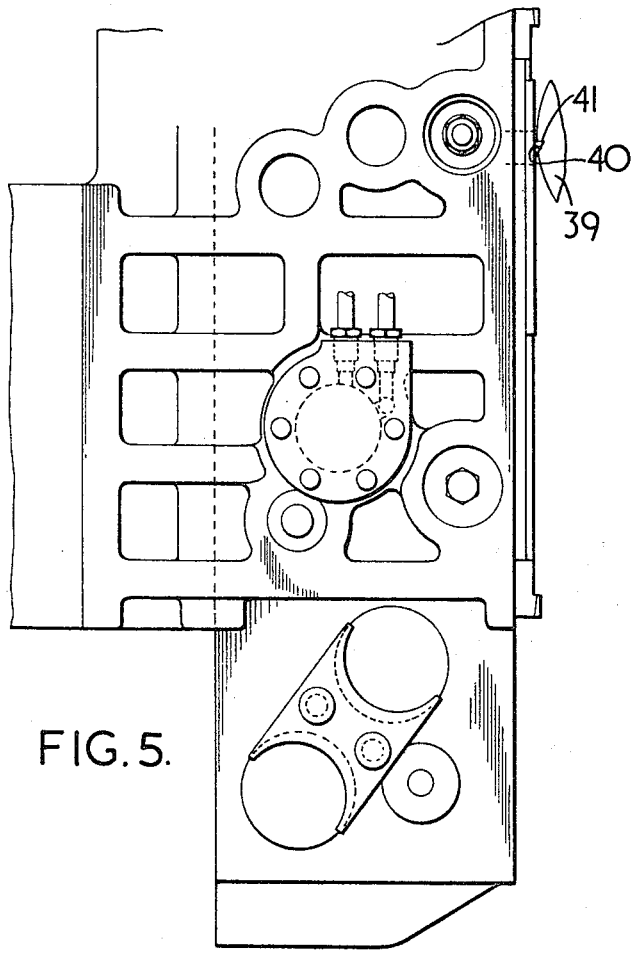
FIGURE 5 is a side view of FIGURE 4.

In the case where the spindle moving into the rear station is to have its tool exchanged automatically, each tool spindle, as shown in FIGURES 4, 5 and 9 is keyed at 27a to a disc 39 provided with a single peripheral notch 40 to coact with a spring-pressed plunger 41 to arrest it in a rotational position in which a diametral key 42 in the end of the spindle will be properly orientated to engage in a diametral slot 43 in the end of each new tool presented to it.

Figure 6:
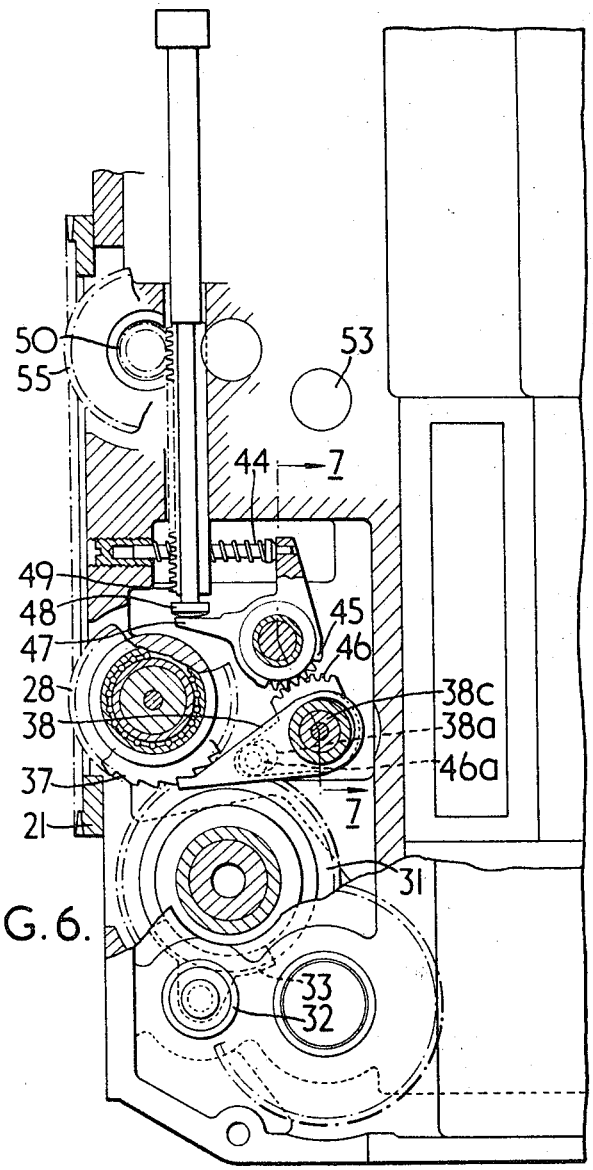
FIGURE 6 is a section on the line 6—6 of FIGURE 4.
Figure 8:
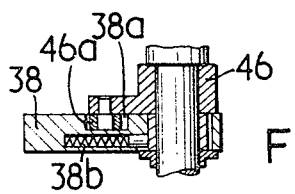
FIGURE 8 is a detail view of a pawl shown in FIGURE 6.

FIGURE 6 shows the mechanism for correctly positioning the idler gear wheel 28 for engagement by the gear wheel 27 of the spindle next fed to the front position, and for correctly orientating the tool spindle fed to the rear position. It will be seen that a compression spring 44 normally biases a toothed quadrant 45, meshed with a toothed quadrant 46 supported from pawl 38 to hold the latter clear of ratchet wheel 37, and that quadrant 45 has a laterally-extending arm 47 on which rests the foot 48 of a rack 49 meshed by a pinion 50. As also shown in FIGURE 8, quadrant 46 is provided with a roller 46a which is accommodated in a slot 38a of the pawl so as to provide lost motion against a spring 38b to protect the pawl when it is urged towards its supporting shaft 38c by the engagement of ratchet wheel 37 with the pawl.

When rack 49 is caused to descend, its foot 48 turns quadrant 45 counter-clockwise in FIGURE 6, and moves pawl 38 into its operative position for positioning the idler gear wheel 28; while when the rack 49 is raised pinion 50 is rotated counter-clockwise to cause the spindle at the rear position to be correctly orientated for accepting a new tool. For this latter purpose pinion 50 is adapted to drive a gear wheel 55 through a one-way-driving device 56, gear wheel 55 meshing the gear wheel 27 (See FIGURE 3) in the rear position and being held frictionally engaged with a flange 57 of a sleeve 58 fast with the head, by a spring 59 (see FIGURE 4).

As the coupling rings 20 and 21 are disengaged, toothed clutch members 51 and 52 engage to cause spindle unit 14 to be rotatively indexed by a rack 53 (see FIGURE 3) engaging a pinion 54 fast with shaft 19 of the stud unit. Racks 24 and 53 are hydraulically operated.

In operation, saddle 12 is first retracted to disengage the workpiece from the tool which is in the front position, and the main input clutch to the change-speed gearing is then disengaged. Next, the spindle in the front position is driven at its creep speed, and rack 49 is operted to bring pawl 38 into its operative position fro arresting the said spindle. Rack 24 is then operated for separating the coupling rings and disengaging the idler gear wheel 28 from the gear wheel 27 of the spindle which is in the front position, and ear wheel 55 from the gear wheel 27 which is in the rear position, and also to engage dog clutch members 51 and 52. In these conditions detents 100 engage both gear wheels 27 to hold the spindles in their correct rotational positions. Thereafter rack 53 is operated to index the spindle unit. After this indexing movement has been completed rack 24 is operated for re-engaging the coupling rings and meshing idler gear wheel 28 with the gear wheel 27 of the tool spindle newly brought to the front position, and for meshing gear wheel 27 on the spindle which has now moved to the rear position with the gear wheel 55 connected through one-way-driving device 56 to be driven by gear wheel 50. This movement also disengages dog clutch members 51 and 52.

After disengaging the creep drive, rack 49 is raised to enable spring 44 to disengage pawl 38 from the ratchet wheel 37 fast with idler gear wheel 28, and the main clutch to the change-speed gearing is re-engaged. The raising of rack 49 also correctly positions that tool spindle in the rear position for receiving a fresh tool. The saddle can then be operated to bring the workpiece up to the new tool. In preparation for the next indexing operation rack 53 is returned to its original position. All of these operations can be effected automatically in the appropriate sequence by including respective control components in an electrical circuit and initiating operation of the latter by a signal received, for example, from a pushbutton or a programming tape.

What I claim as my invention and desire to secure by Letters Patent of the United States is:

1. An indexing head, for a machine tool, comprising a body portion, a tool spindle unit rotatively supported from said body portion, said tool spindle unit comprising at least two tool-carrying spindles with their axes tangential to a notional circle about the axis on which said spindle unit is rotatively supported, means for rotating said spindle unit about its axis of support from said body portion so as to move one of said tool-carrying spindles to a front, operating station and another of said tool-carrying spindles to a rear, tool exchange station, means for driving the tool-carrying spindle which is in the front position while the tool-carrying spindle which is in the rear position remains undriven, a first toothed coupling element fast with said unit coaxially about its rotative support from said body portion, a second toothed coupling element coaxial with said first toothed coupling element and fast with said body portion, means for moving said unit along the axis of its support from said body portion between a first position in which said first and second toothed coupling elements are in engagement with each other to prevent rotation of said unit relatively to said body portion, and a second position in which said toothed coupling elements are axially disengaged from each other to permit rotation of said unit relatively to said body portion, a respective drivable toothed wheel coaxially fast with each tool-carrying spindle, a driving toothed wheel journalled from said body portion adjacent said operating station, a toothed wheel journalled from said body portion adjacent said tool-exchanging position, said driven toothed wheels and said toothed wheels adjacent said operating and tool-exchanging positions being coplanar, the drivable toothed wheel on the tool-carrying spindle at the operating station and the toothed wheel journalled from said body portion adjacent that station adapted to be meshed in the radial direction for providing a first gear pair to drive the tool-carrying spindle at that station, and the drivable toothed wheel on the tool-carrying spindle at the tool exchange station and the toothed wheel journalled from said body portion adjacent that station adapted to be meshed in the radial direction for holding said toothed wheel on the tool-carrying spindle in that station in a desired rotational position, said means for moving said toothed coupling elements axially into engagement with each other moving said drivable toothed wheels radially into mesh with the respective toothed wheels journalled from said body portion, and said means for moving said toothed coupling elements axially out of engagement with each other moving said drivable toothed wheels radially out of mesh with the said respective toothed wheels journalled from said body portion.

2. An indexing head, according to claim 1, in which the tool spindle unit is rotatively fast with a shaft which is journalled in the body portion and has fast with it a pinion meshed with a rack which is driven for indexing one tool-carrying spindle into the operating station and another tool-carrying spindle into the tool exchange station.

3. An indexing head, according to claim 2, in which means are provided for locating the tool-carrying spindles in their appropriate positions at the end of the indexing movement of the tool spindle unit.

4. An indexing head, according to claim 2, in which the tool spindle unit shaft and the pinion meshed with the rack are interconnected by a ball and cam device for moving said unit axially for interengaging and disengaging the toothed coupling elements.

5. An indexing head, according to claim 1, in which, when the toothed coupling elements are disengaged, detents are operated into engagement with the drivable toothed wheels of the tool-carrying spindles which are in the operating and tool exchange stations to hold them in the appropriate positions of orientation for engagement with the respective toothed wheels journalled from the body portion when the said toothed coupling elements are re-engaged with each other.

References Cited

UNITED STATES PATENTS 3,263,300  8/1966  Schatzman et al. ____ 77—25 XR

GERALD A. DOST, *Primary Examiner.*

U.S. Cl. X.R.

29—40